United States Patent [19]
Richardson

[11] 3,895,513
[45] July 22, 1975

[54] VISCOMETRIC APPARATUS

[75] Inventor: Claude Alan Richardson, Egham, England

[73] Assignee: Stanhope-Seta Limited, Surrey, England

[22] Filed: Nov. 14, 1973

[21] Appl. No.: 415,641

[30] Foreign Application Priority Data
June 12, 1973 United Kingdom............... 28033/73

[52] U.S. Cl. ..................................................... 73/55
[51] Int. Cl. ........................................... G01n 11/06
[58] Field of Search .................................. 73/55, 56

[56] References Cited
UNITED STATES PATENTS

| | | | |
|---|---|---|---|
| 3,071,961 | 1/1963 | Heigl et al. | 73/55 |
| 3,540,264 | 11/1970 | Cerrutti et al. | 73/55 |
| 3,604,247 | 9/1971 | Gramain et al. | 73/55 |
| 3,713,328 | 1/1973 | Aritomi | 73/55 |
| 3,798,960 | 3/1974 | Glass | 73/55 |

FOREIGN PATENTS OR APPLICATIONS
271,092  5/1970  U.S.S.R................................. 73/55

*Primary Examiner*—Jerry W. Myracle
*Assistant Examiner*—Joseph W. Roskos

[57] ABSTRACT

Viscometric apparatus including a plurality of calibrated viscometry tubes have their lower ends connectable by valve means either to the ambient air or to a suction source by which cleansing liquids may be drawn through the tubes before their re-use. The tubes have their upper ends connectable by further valve means either to the ambient air, possibly by way of air cleaning and heating means or to a reservoir of cleaning fluid. The tubes may be provided with electro-optical sensors yielding signals as the liquid sample falling through the tube passes fiducial marks and these signals may control measuring means. The measurement results may be stored and selectively displayed or printed.

9 Claims, 5 Drawing Figures

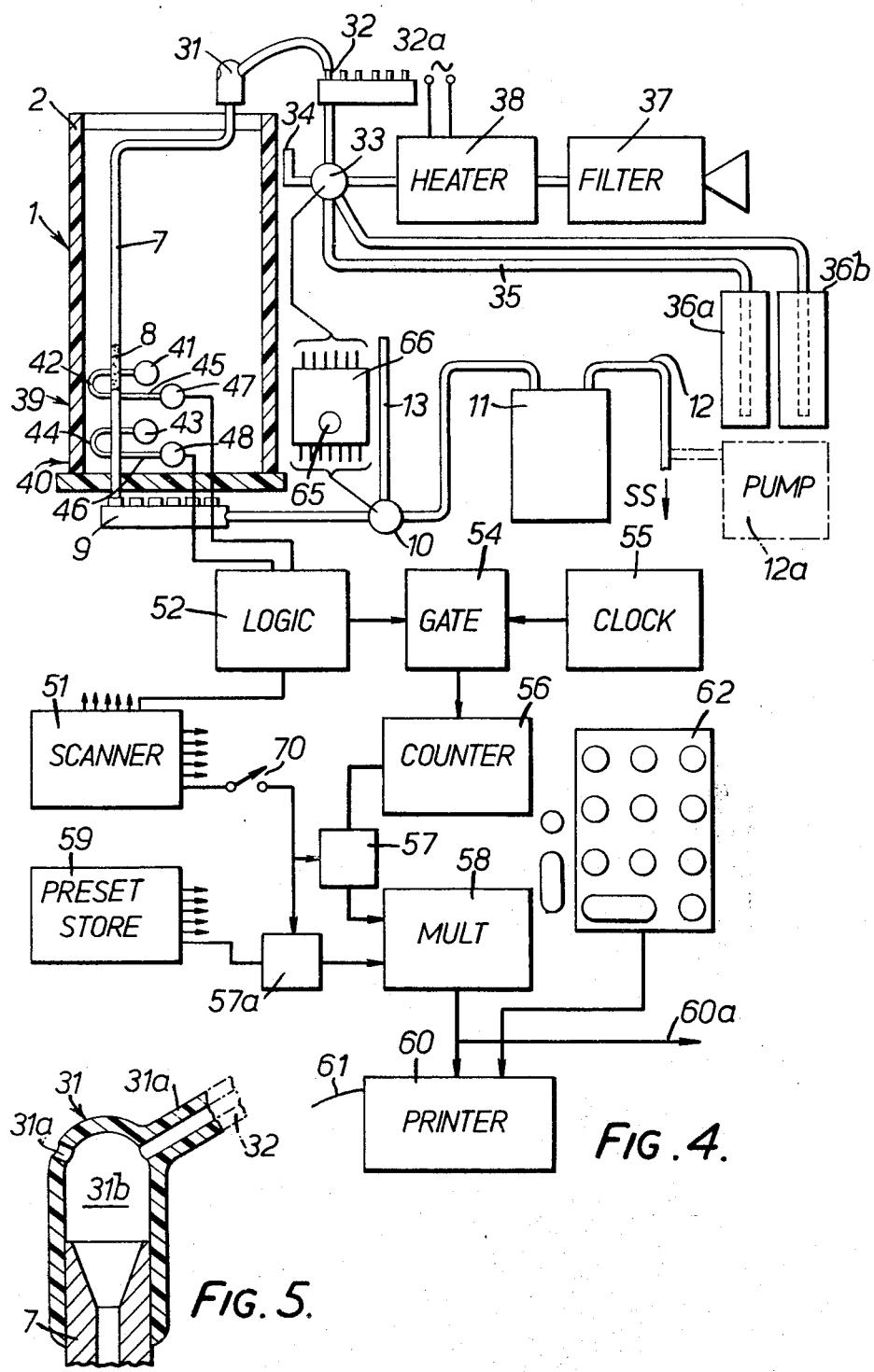

VISCOMETRIC APPARATUS

The present invention relates to viscometers and has for its object the provision of viscometric apparatus which enables the viscosity of liquids to be measured very conveniently under laboratory and other conditions.

In the kinematic measurement of the viscosity of liquids, a sample of the liquid is introduced into a precalibrated viscometer tube and the time taken for a meniscus of the liquid to travel between two known positions multiplied by the tube constant obtained on calibration is numerically equal to the viscosity expressed in centistokes.

The present invention provides improved viscometric apparatus capable of performing kinematic viscosity measurements in a simple and convenient manner.

BRIEF DESCRIPTION OF THE DRAWINGS

Preferred features and advantages of embodiments of the invention will become apparent from the following description of embodiments thereof, taken in conjunction with the accompanying drawings, of which:

FIG. 4 is a schematic diagram illustrating the operation of the apparatus of FIG. 3, and FIG. 5 is a sectional view of a component of the apparatus shown in FIG. 3.

DESCRIPTION OF THE PREFERRED EMBODIMENT

Figure 1:
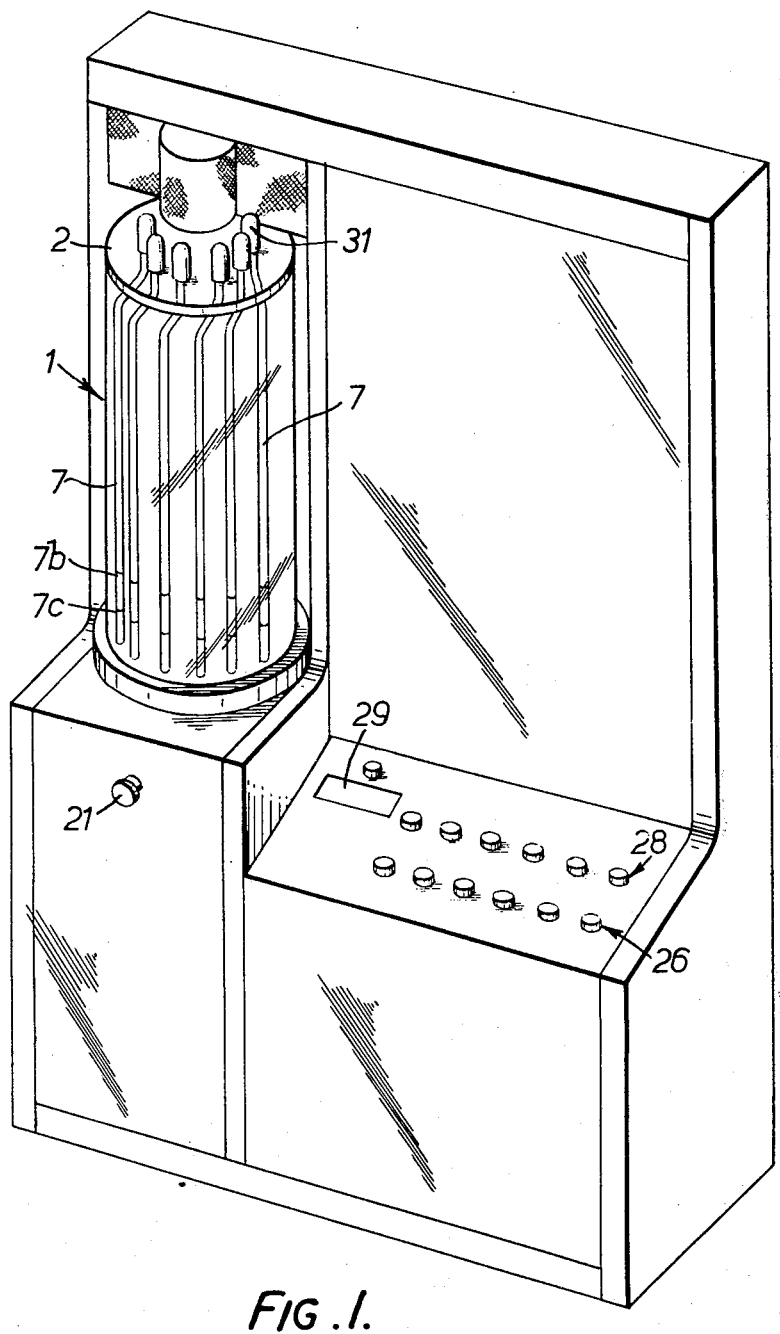
FIG. 1 is a perspective view of an embodiment of viscometric apparatus according to the invention.
Figure 2:
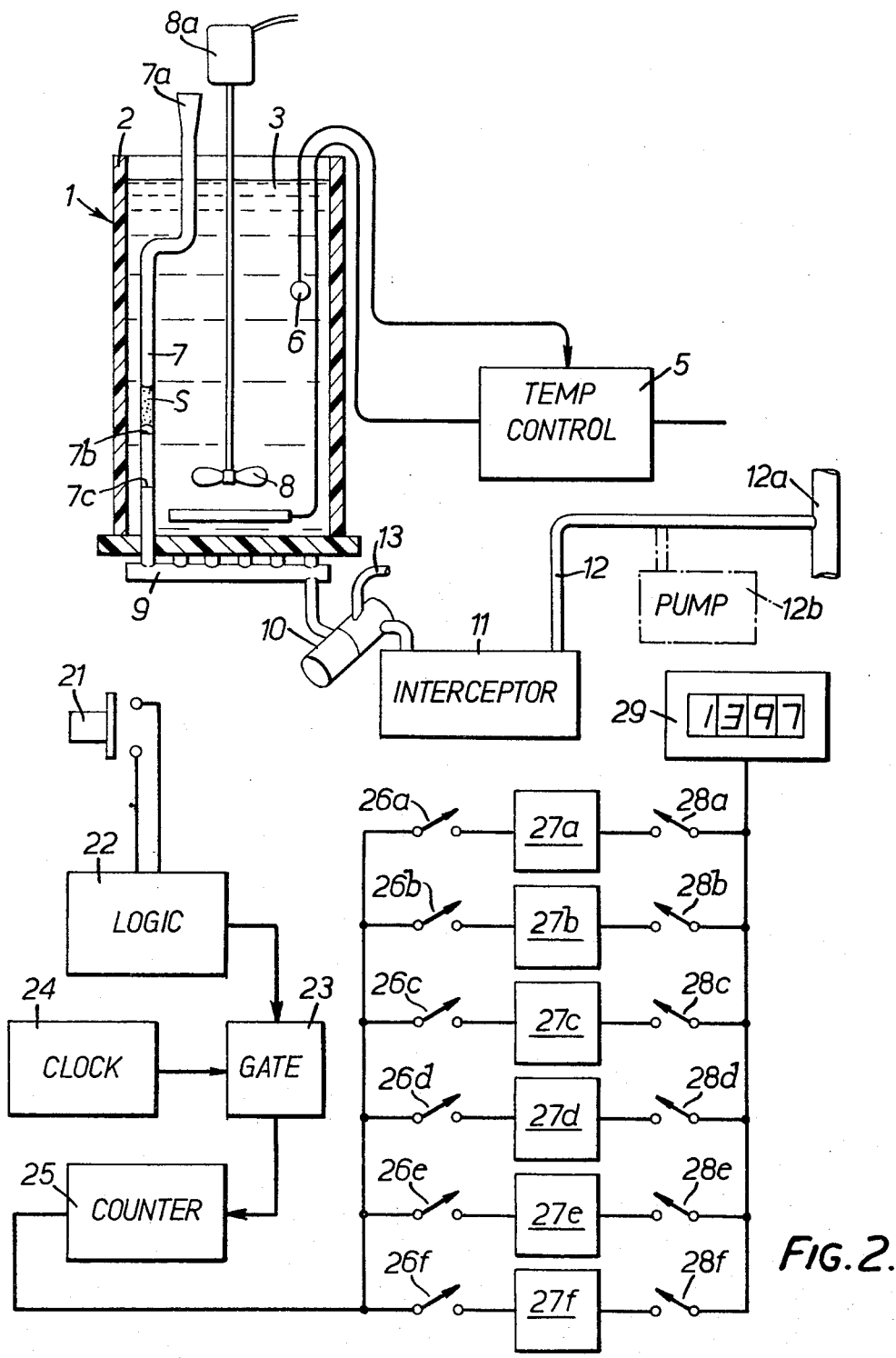
FIG. 2 is a schematic diagram illustrating the operation of the apparatus of FIG. 1.

The apparatus shown in FIGS. 1 and 2 includes a temperature stabilized bath 1, conveniently provided with thermally insulating transparent walls 2 and containing a suitable liquid medium 3. The temperature of the liquid medium 3 is stabilized by known means including an electrical heating element 4, the current supplied to which is controlled by known control means 5 responsive to a temperature-sensitive means 6, conveniently a thermistor, immersed in the bath. More than one thermistor and more than one heater may be provided and appropriate fluid circulating means, such as a stirrer 8 driven by an electric motor 8a may be included in the bath if desired. Within bath 1 is disposed a plurality of kinematic viscosity determination (viscometry) tubes 7, of which one only is shown in FIG. 2 for the sake of convenience in illustration. As is seen from FIG. 1, the illustrated embodiment of the apparatus includes six such tubes. In use a sample S of the material of which the viscosity is to be measured is introduced into each tube at its upper end 7a and is caused to descend through the tube. The time taken for the sample to pass between two fiducial marks 7b, 7c is a measure of the viscosity, and when multiplied by a constant obtained by calibration of the tube, gives the viscosity directly in centistokes.

In known viscometric apparatus of this kind it has been necessary to remove the viscometry tube for cleaning after a measurement has been completed, and to re-stabilize the temperature of the bath after the tubes have been replaced, a time-consuming matter. In the present apparatus this difficulty is avoided by arranging that the tubes need not be removed from the bath for cleaning. To this end the lower end of each viscometry tube 7 is connected with a manifold 9 which, by means of a valve 10 may be connected either to the ambient temperature by way of a conduit 13 or, preferably by way of an interceptor 11, to a suction source by way of a conduit 12. The suction source may consist of a suction line 12a already provided at a position at which the apparatus is to be used, or the apparatus may itself comprise a suitable suction pump 12b.

This arrangement allows very convenient cleansing of the viscometer tubes. When valve 10 is actuated to connect manifold 9 to suction source 12 the sample within each viscometer tube 7 will be extracted and deposited in interceptor 11. A volatile or other cleansing fluid may then be introduced into the viscometer tubes, this will be drawn through the tubes into the reservoir and continued suction will allow the residual cleansing fluid to be removed by extraction and/or evaporation.

The apparatus illustrated in FIGS. 1 and 2 also includes a convenient means for recording and observing the timings measured on the different viscometry tubes. Timing of each sample as it passes between the fiducial marks on the viscometry tube is effected by an observer pressing a timing button 21. By means of suitable logic circuitry 22 such as is commonplace in the electronics field, it is arranged that the first pressure on this button causes the opening of a gate circuit 23 through which clock pulses from a crystal-controlled clock oscillator 24 pass to a counter circuit 25, the second pressure being arranged to close gate 23. The counter 25 counts the number of clock pulses passing through gate 23 between the first and second pressures on button 22. There is thus entered into counter 25 a number representative of the viscosity of the sample. It is convenient that the least significant digit of the count represents 0.1 second. By selective actuation of six switches 26a – 26f the count recorded by counter 25 is stored in one of six stores 27a – 27f, while selective actuation of another six switches 28a – 28f applies the count stored in a selected one of stores 27a – 27f to control a display means 29, conveniently consisting of seven-element L E D display devices yielding a four-digit display representative of the stored count. This arrangement provides the advantage that the measurement made on any one of the samples may be selected for display as desired.

It will be understood that the arrangement shown in FIG. 2 is wholly schematic; the manually operable switches 26 in fact must in known manner control a plurality of preferably solid-state switches each in turn controlling the transfer of one bit of information from counter 25 to a store 27, which each of manual switches 28 correspondingly controls a plurality of preferably solid-state switches in turn controlling signal transfer from a store 27 to control display device 29. Display device 29 will include known decoder means by which decimal or decimal-coded binary signals applied to the unit will produce required selective energization of the seven segments of the LED display units. Usually, it will be convenient for the display 29 to be connected to a store 27a – 27f while that store is being used to receive the number counted during a measurement. When a set of six measurements is complete the stored results may be re-displayed as required for subsequent processing.

It is also convenient, though not essential, for each of the viscometry tubes 7 to be provided with a hood member 31 of the kind described below with reference to FIG. 5, which simplifies the insertion of liquid samples into the tubes.

Figure 3:
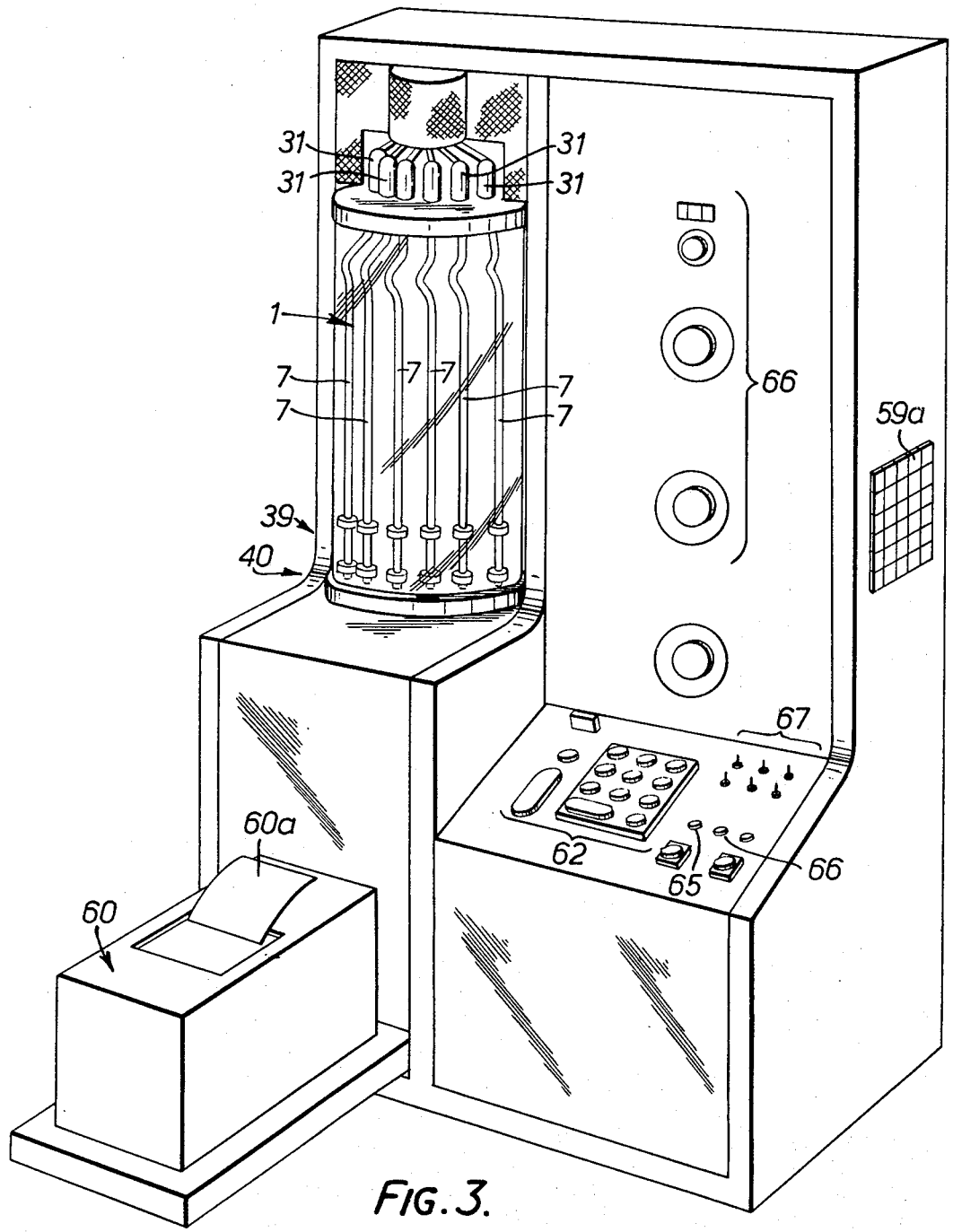
FIG. 3 is a perspective view of another embodiment of viscometric apparatus according to the invention.

The modified apparatus described below with reference to FIGS. 3 – 5 has advantages in that the operation is to a large extent automated. The apparatus is similar to that of FIGS. 1 and 2 in comprising a temperature-stabilized bath 1 containing a plurality of kinematic viscosity-determining tubes 7, six in the embodiment shown, of which one only is shown in FIG. 2 for the sake of clarity in illustration. Also as in the previous embodiment the lower end of each of tubes 7 is connected to a manifold 9 which, by way of a valve 10 may be connected to a suction source SS by way of a conduit 12, preferably through an interceptor 11, or alternatively to the ambient atmosphere through a conduit 13. If a suction line is not available for use as suction source SS a suction pump 12a may be included in the apparatus. In this case, the upper end of each of tubes 7 is enclosed by a hood 31 each of which is connected by means of a conduit 32 to a manifold 32a leading to a valve 33 by means of which the upper end of the tubes may be selectively connected to the ambient atmosphere by way of a conduit 34, by way of a tube 35 to one or, as shown, preferably two reservoirs 36a, 36b containing respective cleansing fluids or to a means for supplying filtered and possibly warmed air to the tube, this latter means being shown as consisting of a filter 37 and an electrical heater 38.

The passage of the sample 8 past the fiducial positions on the viscometric tube 7 is in this embodiment determined by two similar photoelectric devices 39, 40. Each device comprises a respective light source 41, 43 provided with an individual light guide 42, 44 by which light from the source is directed transversely of tube 7 at one fiducial position. Opposed to each of light guides 42, 44 is a further respective light guide 45, 46 by which received light is transferred to a respective photocell 47, 48. It is arranged that the passage of a meniscus of the sample through the light passing between the light guides yields a control signal which is used to control the operation of a timer.

The signals from photocells 47 and 48 for each tube are applied by way of a known logic circuit 52 to control a respective gate circuit 54 by which signals from a common clock generator 55 are allowed to pass to a respective counter 56 during the period between the passage of the sample meniscus past the first and past the second fiducial position. There are thus formed in counter 56 and made available at its output signals respectively of the time taken for the sample to pass through the calibrated distance.

The scanner 51 is a known selector device which investigates each logic circuit 52 in turn to determine when a measurement result is available, that is, when the respective gate circuit 54 has been opened and closed. When a measurement has been completed, scanner 51 will actuate gates 57, 57a to transfer into a multiplier 58 the signals from counter 56 representative of the measured time. In multiplier 58 the signal from counter 56 is multiplied by a calibration signal appropriate to the respective tube, thus yielding a signal directly representative of the measured viscosity. The calibration signals are derived from the respective position in a preset store 59. Store 59 advantageously consists of a set of key-actuated switches 59a appropriate to each viscometry tube 7, the switches being of a known kind in which appropriate connections are made in response to the insertion of a digitally marked key element. To change a stored number when a tube has been changed the existing keys are withdrawn and replaced by appropriately numbered keys representative of the new number.

The output signal from multiplier 58, which has been said is representative of the measured viscosity of a sample, is applied to a printer 60 by which the number is printed on record tape 60a to yield a visual record thereof, or otherwise recorded. This signal can alternatively or in addition be taken to an output 60a and used to perform a control function or to actuate an indication device. Preferably, provision is made for the addition to the tape 60a, either before or after the printing of the result of the measurement, of additional numerical information. To this end an "Insert Data" control 61 is actuated to enable a keyboard 62 including ten digit keys and a space key. Operation of the keys of keyboard 61 causes corresponding numerical information to be printed on the record other keys control tape movement. A lock control is provided to prevent inadvertent actuation of the printer.

A "Flush" control 65 may be actuated to initiate a cleansing cycle, already described, by which valve 10 is actuated to apply suction to the viscometry tube manifold 9. A further control 66 actuates valve 33 to pass first cleansing fluids and then clean air through the viscometry tubes. This cycle is controlled by a timer device 66 of obvious construction.

A "Tube Select" switch 70 is provided for each tube by which any tube not to be used for any reason may be excluded from the scanning cycle.

FIG. 5 illustrates the form of the hood member 31 provided at the top of each viscometry tube 7 of the present embodiment. The hood is made of an elastomeric material to fit closely about the tube 7 and is provided with a tubulation 31a by which the space 31b within the hood is connected with tube 32. A narrow orifice 31c is provided in the wall of hood 31 through which may be inserted the nozzle of a syringe used to insert an appropriate sample into the measurement tube. This hood member may also be used in the apparatus of FIGS. 1 and 2 to assist in the insertion of a sample.

A particular application in which the described apparatus is especially useful in the determination of the viscosity of transparent or opaque liquids - new or used oils - and many other liquids to the requirements of ASTM D445/IP71 and of course many other specifications. The nominal constants of the viscometry tubes may be 0.03, 0.05, 0.1, 0.3, 0.5, 1.0, 3.0 or 5.0 measured and provided to the nearest 0.1% of their value. Each tube is engraved with its calibration constant to four significant figures and this value may be introduced into the measured viscosity by appropriate setting of the preset store switches 59a.

The temperature at which the measurement is conducted can be adjusted in known manner by means of appropriate controls 66.

I claim:

1. In viscometric appartus including a generally vertically disposed viscometry tube having an upper end and a lower end and including a capillary portion intermediate said ends and said tube having associated with said capillary portion fiducial marks so spaced that the time of passage of a liquid sample of predetermined volume is a measure of the viscosity of said sample, a suction source and valve means operable to connect said tube to said suction source and to the ambient air, the improvement which comprises:

a hood member applied to the upper end of said viscometry tube, said hood member having therein an aperture for injection of said liquid sample;

a reservoir of cleansing fluid;

first valve means coupled with said lower end of said viscometry tube;

second valve means;

and conduit means coupling said hood member with said second valve means;

said first valve means being operable to connect said lower end of said viscometry tube alternatively with said suction source and with the ambient air and said second valve means being operable to connect said hood member alternatively with said reservoir or with said ambient air.

2. Viscometric apparatus as claimed in claim 1 and further including air cleansing and heating means, wherein said further valve means is selectively operable to connect said hood to the atmosphere both by way of said air cleansing and heating means and directly.

3. Viscometric apparatus as claimed in claim 2 wherein each of said valve means and said further valve means is electrically operable and further including electrical timer means yielding upon initiation predeterminedly related valve actuating outputs to actuate said valve means and said further valve means;

a cleansing operation initiating switch and means coupling said initiating switch to initiate said timer means whereby said valve means and said further valve means are successively initiated by said timer outputs so that said lower end of said viscometry tube is connected to said suction source for a predetermined interval during which interval said upper end of said viscometry tube is connected sequentially, firstly to said reservoir of cleansing liquid and then to the ambient air by way of said air cleansing and heating means.

4. Viscometric apparatus as claimed in claim 2 including a further reservoir of cleansing liquid and wherein said further valve means is operable to connect said upper end of said viscometry tube sequentially firstly to said reservoir of cleansing liquid, secondly to said further reservoir of cleansing liquid and thirdly to the ambient air by way of said air cleansing and heating means.

5. Viscometric apparatus in accordance with claim 1 including a plurality of said viscometry tubes, each of said viscometry tubes having its lower end coupled with a manifold connected to said valve means.

6. Viscometric apparatus as claimed in claim 5 wherein each of said viscometry tubes has its upper end coupled by way of a conduit with said further valve means.

7. The apparatus claimed in claim 1 and further including spaced electro-optical sensor means associated with each said viscometry tube to develop respective electrical timer actuating signals as said liquid sample passes a respective one of said fiducial marks;

electrical timer means fed with said timing actuator signals to develop a coded time signal representative of the time of passage between said fiducial marks;

a plurality of preset storage means, arranged to store calibration signals, each said signal representing a calibration constant of a respective one of said viscometry tubes;

signal multiplier means yielding an output signal representing a product of two signals applied thereto;

signal selector means operable to apply selectively to said multiplier means a said coded time signal derived from one said viscometry tube and the calibration signal of said tube whereby said multiplier yields an output signal denotive of the viscosity of said sample; and printer means fed with said output signal and yielding a record of said viscosity.

8. The apparatus claimed in claim 7 and further including keyboard means operable to cause said printer means to record desired arbitrary information.

9. The apparatus claimed in claim 7 wherein each said electro-optical sensor means includes a light source, first light-guide means conducting light from said source to one side of a said viscometry tube at a said fiducial mark;

photo-sensitive means; and further light-guide means conducting light from a position opposite said first light-guide means to said photo-sensitive means whereby said photo-sensitive means yields a signal denotive of the passage of a meniscus of said sample past said fiducial mark.

* * * * *